US012151661B2

United States Patent
Potter et al.

(10) Patent No.: US 12,151,661 B2
(45) Date of Patent: Nov. 26, 2024

(54) VEHICLE BRAKE CONTROL SYSTEM AND METHOD

(71) Applicant: Westinghouse Air Brake Technologies Corporation, Pittsburgh, PA (US)

(72) Inventors: William John Potter, Trafford, PA (US); Edward W. Gaughan, Greensburg, PA (US)

(73) Assignee: Westinghouse Air Brake Technologies Corporation, Pittsburgh, PA (US)

( * ) Notice: Subject to any disclaimer, the term of this patent is extended or adjusted under 35 U.S.C. 154(b) by 470 days.

(21) Appl. No.: 17/397,766

(22) Filed: Aug. 9, 2021

(65) Prior Publication Data

US 2022/0063574 A1    Mar. 3, 2022

Related U.S. Application Data

(60) Provisional application No. 63/070,898, filed on Aug. 27, 2020.

(51) Int. Cl.
*B60T 8/17*    (2006.01)
*B60T 8/171*    (2006.01)
(Continued)

(52) U.S. Cl.
CPC ............ *B60T 8/1705* (2013.01); *B60T 8/171* (2013.01); *B60T 13/241* (2013.01); *B60T 17/221* (2013.01); *B60T 2270/88* (2013.01)

(58) Field of Classification Search
CPC ...... B60T 8/1705; B60T 8/171; B60T 13/241; B60T 17/221; B60T 2270/88
(Continued)

(56) References Cited

U.S. PATENT DOCUMENTS 6,227,625 B1 * 5/2001 Gaughan ............. B61L 15/0027
73/39
6,474,748 B1 * 11/2002 Cunkelman ........... B60T 13/665
303/81
(Continued)

FOREIGN PATENT DOCUMENTS

CN    104203676 A  * 12/2014 ............ B60T 11/101
EP      1012019 B1    1/2003
(Continued)

OTHER PUBLICATIONS

First Examination Report received for related AU Patent Application No. 2021221437 dated May 29, 2023 (11 pages).
(Continued)

*Primary Examiner* — Lindsay M Low
*Assistant Examiner* — Omar Morales
(74) *Attorney, Agent, or Firm* — K&L Gates LLP (57) ABSTRACT

A brake control system includes one or more processors communicatively connected to at least one sensor configured to output at least one property measurement of air in a brake pipe of a vehicle braking assembly. The one or more processors are configured to determine, based on the at least one property measurement, a pressure reduction lower limit (PRLL) in the brake pipe. The one or more processors are further configured to control movement of a vehicle system that includes the brake pipe to enforce the PRLL by preventing a pressure reduction in the brake pipe that is less than the PRLL while one or more air reservoirs of the vehicle braking assembly are at a reduced charge state.

20 Claims, 4 Drawing Sheets

(51) Int. Cl.
B60T 13/24 (2006.01)
B60T 17/22 (2006.01)

(58) Field of Classification Search
USPC .......................................................... 701/70
See application file for complete search history.

(56) References Cited

U.S. PATENT DOCUMENTS

| | | |
|---|---|---|
| 2002/0153765 A1 | 10/2002 | Levy et al. |
| 2003/0009274 A1 | 1/2003 | Peterson, Jr. et al. |
| 2003/0066360 A1 | 4/2003 | Kettle et al. |
| 2016/0318491 A1 | 11/2016 | Seaton |
| 2019/0168728 A1* | 6/2019 | Venkatasubramanian ................... B60T 13/665 |
| 2019/0176791 A1 | 6/2019 | Potter et al. |
| 2020/0079342 A1 | 3/2020 | Gaughan et al. |

FOREIGN PATENT DOCUMENTS

| | | |
|---|---|---|
| RU | 2729496 | 8/2020 |
| SU | 1572878 A1 | 6/1990 |
| WO | 1999038743 A1 | 8/1999 |
| WO | 2011050243 A2 | 4/2011 |
| WO | 2020100076 A1 | 5/2020 |
| WO | 2021199174 A1 | 10/2021 |

OTHER PUBLICATIONS

Examination Report mailed Mar. 16, 2022 for corresponding Indian Patent Application No. 202114037306 (6 pages).
Office Action received for related EA Patent Application No. 202192048 dated Apr. 7, 2023 (5 pages).
First Office Action received for related CN Patent Application No. 2021109978486 dated May 22, 2023 (16 pages).
English translation of the Office Action mailed Sep. 12, 2022 for corresponding Eurasian Patent Application No. 202192048 (2 pages).
Office Action mailed Sep. 12, 2022 for corresponding Eurasian Patent Application No. 202192048 (2 pages).
Hearing Notice received for related Indian Patent Application No. 202114037306 dated Feb. 16, 2023 (3 pages).

* cited by examiner

VEHICLE BRAKE CONTROL SYSTEM AND METHOD

CROSS-REFERENCE TO RELATED APPLICATIONS

This application is a non-provisional conversion of, and claims priority to, U.S. Provisional Application No. 63/070,898, filed Aug. 27, 2020, which is incorporated by reference herein in its entirety.

BACKGROUND

Technical Field

The subject matter herein describes embodiments relating to vehicle braking operations, and more specifically to avoiding an undesirable release of brakes on a vehicle.

Discussion of Art

Some vehicle systems have a brake pipe that continuously extends through multiple interconnected vehicles of the vehicle system along a length of the vehicle system. Rail-based freight trains are an example, as the brake pipe can extend hundreds or even thousands of meters through railroad cars of the train. The brake pipe is charged with compressed air by one or more compressors onboard the vehicle system. The compressed air not only provides the pneumatic brake force for applying friction brakes at the respective vehicles, but also serves as a communication link via which the friction brakes of the multiple vehicles are controlled to apply and release by modifying the air pressure in the brake pipe. For example, a brake application is triggered by venting air from the brake pipe, referred to as a brake pipe reduction. The brake pipe reduction causes a differential at a brake valve between the air pressure in the brake pipe and air pressure within a local reservoir onboard each corresponding vehicle. In response to the differential, the brake valve supplies compressed air from the reservoir to a brake cylinder which applies the friction brakes. The brakes can be released by supplying compressed air to the brake pipe to raise the pressure in the brake pipe. When the air pressure in the brake pipe is greater than the air pressure in the local reservoir, the brake valve is designed to release the compressed air from the brake cylinder, which releases the brake application.

Following the brake release, the brake system recharges over time as compressed air supplied to the brake pipe increases the air pressure within the brake pipe and within the local air reservoirs onboard the vehicles of the vehicle system. If a slight brake pipe reduction is made to provide another brake application before the local air reservoirs are fully charged, an unintentional and undesirable brake release may occur on at least some of the vehicles of the vehicle system. The unintentional brake release is caused by a limiting valve, such as a quick service limiting valve (QSLV), that is designed to ensure that the brake cylinders receive at least a designated air pressure in response to every brake application. When a slight brake pipe reduction is made while the local air reservoirs are still charging, the limiting valve directs compressed air from the brake pipe to the brake cylinders to supplement the compressed air from the local air reservoirs until the designated air pressure is satisfied within the cylinders. As a result, the pressure in the brake pipe may fall below a target or expected brake pipe reduction value. The brake valve subsequently supplying compressed air into the brake pipe to recover the brake pipe pressure may cause the brake pipe pressure to exceed the pressure in one or more of the local air reservoirs by a differential sufficiently large to trigger an unintentional release of the brakes. Thus, during a braking operation in which a slight brake pipe reduction is made for the purpose of slowing or stopping the vehicle system, at least some of the brakes may unintentionally release.

The unintentional release of brakes of a vehicle system during a brake application reduces the amount of control of the vehicle system, as the vehicle system may not be able to slow or stop as quickly as desired. And, the venting of brake cylinder pressure due to the unintentional release may reduce the reservoir pressure available for subsequent brake applications, such that the vehicle system may have inadequate braking capability at least until the braking assembly has time to fully recharge.

BRIEF DESCRIPTION

In one or more embodiments, a brake control system is provided that includes one or more processors. The one or more processors are configured to be communicatively connected to at least one sensor configured to output at least one property measurement of air in a brake pipe of a vehicle braking assembly. The one or more processors are configured to determine, based on the at least one property measurement, a pressure reduction lower limit (PRLL) in the brake pipe. The one or more processors are further configured to control movement of a vehicle system that includes the brake pipe to enforce the PRLL by preventing a pressure reduction in the brake pipe that is less than the PRLL while one or more air reservoirs of the vehicle braking assembly are at a reduced charge state.

In one or more embodiments, a method is provided that includes receiving at least one property measurement of air in a brake pipe of a braking assembly on a vehicle system. The method includes determining, based on the at least one property measurement, a pressure reduction lower limit (PRLL) in the brake pipe. The method also includes controlling movement of the vehicle system to enforce the PRLL, by not allowing a pressure reduction in the brake pipe that is less than the PRLL, during time periods that one or more air reservoirs of the braking assembly are at a reduced charge state.

In one or more embodiments, a brake control system is provided that includes a flow sensor and one or more processors. The flow sensor is configured to generate a flow rate measurement of air in a brake pipe of a braking assembly on a vehicle system. The one or more processors are configured to be communicatively connected to the flow sensor and to determine, based on the flow rate measurement received from the flow sensor, that one or more air reservoirs of the braking assembly are at a reduced charge state. The one or more processors are further configured to determine, based on the flow rate measurement, a pressure reduction lower limit (PRLL) in the brake pipe. Responsive to receiving a brake application command during one of the time periods that the one or more air reservoirs are at the reduced charge state, the one or more processors are configured to control movement of the vehicle system to enforce the PRLL by venting the brake pipe to cause a pressure reduction in the brake pipe that is no less than the PRLL.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments described herein are directed to a brake control system and method for providing reliable and consistent braking along the length of a vehicle system. The system and method intervene in braking operations to avoid the unintentional brake releases that can occur when a light brake pipe pressure reduction is made while the reservoirs of the vehicle system are at a reduced charge state. The reservoirs may be at the reduced charge state as the reservoirs receive compressed air to charge the reservoirs following a previous brake application. The system and method can prevent the unintentional brake releases by determining and enforcing a lower limit of the brake pipe pressure reduction while the reservoirs are at the reduced charge state. The pressure reduction lower limit (PRLL) refers to a minimum allowable pressure drop in the brake pipe in response to a brake application command. For example, if the PRLL is 14 psi and a brake application command calls for a brake pipe reduction of 8 psi during a time period in which the reservoirs are at the reduced charge state, the brake control system enforces the PRLL by automatically increasing the amount of air vented from the brake pipe to cause a pressure drop of at least 14 psi in the brake pipe (rather than only the 8 psi drop that was commanded). Determining and enforcing the PRLL ensures that the reservoir supplies all of the compressed air to the brake cylinder during the brake application, instead of causing a limiting valve (such as a quick service limiting valve) to direct air from the brake pipe to supplement the air received from the reservoir.

At least one technical effect of the brake control system and method disclosed herein is increased control over the vehicle system, relative to vehicle systems operated without using the disclosed brake control system and method, by avoiding unintentional brake releases and the associated detrimental effects. For example, unintentional brake releases can diminish the braking capabilities of the vehicle system during a current braking application as well as forthcoming braking applications. Another technical effect is that the brake control system and method can be incorporated onto a vast array of existing vehicle systems that have pneumatic brake assemblies including, but not limited to, manually-operated vehicle systems in a conventional mode in which operator inputs onboard a propulsion vehicle are used to control movement of the vehicle system, autonomous vehicle systems in the conventional mode, autonomous vehicle systems operating in a distributed power configuration, rail-based trains, road-based trains, and the like.

Figure 1:
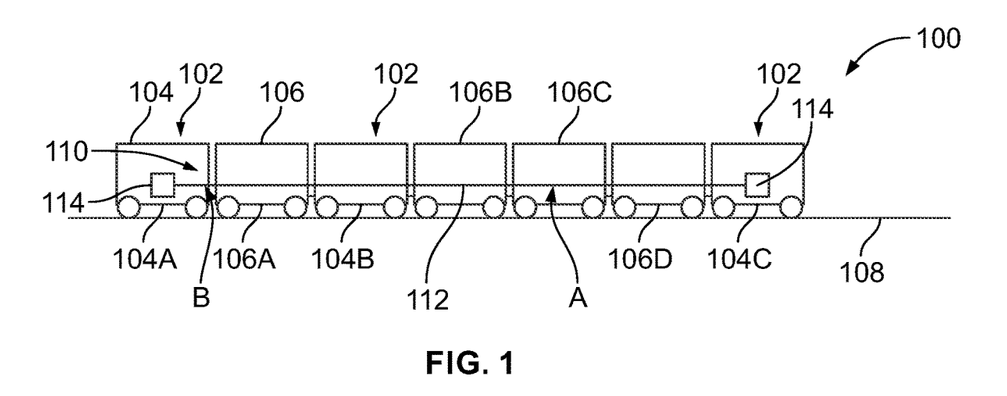
FIG. 1 illustrates a vehicle system on which a brake control system according to one or more embodiments herein can be implemented.

FIG. 1 illustrates a vehicle system 100 on which a brake control system according to one or more embodiments herein can be implemented. The vehicle system includes several vehicles 104, 106 that travel along a route 108. The vehicles 104 (e.g., the vehicles 104A-C) represent propulsion-generating vehicles that generate tractive effort or power to in order to propel the vehicle system along the route. The vehicles 106 (e.g., the vehicles 106A-D) represent non-propulsion generating vehicles that do not generate tractive effort or power. Some of the non-propulsion-generating vehicles may be disposed between propulsion-generating vehicles. The propulsion-generating vehicles also include propulsion systems. The non-propulsion-generating vehicles include brake systems but lack propulsion systems, such that the propulsion-generating vehicles propel the non-propulsion-generating vehicles along the route. The vehicle system may have as few as one propulsion-generating vehicle and as few as zero non-propulsion-generating vehicles. The vehicle system also may include more vehicles than shown in FIG. 1.

The vehicles in FIG. 1 are mechanically interconnected in a single-file line and travel together along the route. The vehicles are connected via couplers. The vehicle system includes a braking assembly 110 that continuously extends along the length of the vehicle system, across the vehicles that form the line. For example, the braking assembly includes a brake pipe 112 that continuously extends along the length of the vehicle system. Segments of the brake pipe mounted to different vehicles are connected together between adjacent vehicles via connectors, such as gladhand connectors. Each of the vehicles has a respective brake system that represents a portion of the braking assembly. The brake system on each vehicle is fluidly connected to the brake pipe. The braking assembly also includes at least one air compressor 114 that supplies compressed air to the brake pipe. In the illustrated embodiment, the braking assembly includes a (first) compressor on the propulsion-generating vehicle 104A and another (second) compressor on the propulsion-generating vehicle 104C. The compressors are spaced apart along the length of the brake pipe from each other. For example, the vehicles 104A, 104C are disposed at opposite ends of the vehicle system. Both compressors supply compressed air into the brake pipe, and the compressed air flows along the brake pipe to supply air to all of the brake systems of the vehicle system. In an alternative embodiment, the vehicle system may have only a single compressor. In yet another alterative embodiment, the vehicle system may have three or more compressors spaced apart along the length of the vehicle system.

In one non-limiting embodiment, the vehicle system is a rail-based train, and the route is a railroad track. The propulsion-generating vehicles are locomotives. The three locomotives shown in FIG. 1 may represent a consist 102. The non-propulsion-generating vehicles can be rail cars that carry cargo and/or passengers. In another non-limiting embodiment, the vehicle system is a road train, and the route is a road or path. For example, the propulsion-generating vehicles may be trucks (e.g., highway semi-trucks, mining trucks, logging trucks, or the like), and the non-propulsion-generating vehicles may be trailers coupled to the trucks. In yet other embodiments, the vehicle system may be other types of vehicles.

In a non-limiting example, the vehicle system is configured to operate in a distributed power arrangement in which control signals generated from one of the propulsion-generating vehicles are communicated to one or more other propulsion-generating vehicles designated as remote to control the movement of the remote propulsion-generating vehicle(s). The propulsion-generating vehicle that generates the control signals is designated as a lead vehicle. For example, the first propulsion-generating vehicle 104A may be designated as the lead vehicle, and control signals generated by the first propulsion-generating vehicle may control the movement of the second and third propulsion-generating vehicles 104B, 104C. The lead may be vehicle disposed at a front of the vehicle system based on the direction of travel of the vehicle system, but the lead vehicle can be spaced apart from the front end in another embodiment.

Figure 2:
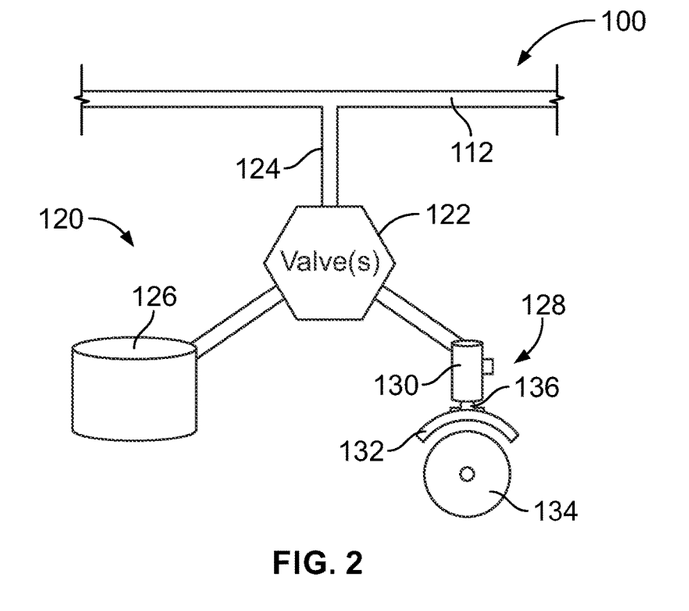
FIG. 2 is a schematic illustration of a brake system of a braking assembly of the vehicle system.

FIG. 2 is a schematic illustration of a brake system 120 of the braking assembly 110. The brake system is disposed onboard one of the vehicles of the vehicle system. For example, the brake system in FIG. 2 may be disposed onboard the non-propulsion-generating vehicle 106C in the location of the letter A in FIG. 1. The illustrated brake system is a simplified representation of the braking mechanism. The brake system includes a segment of the brake pipe 112 that is fluidly connected to other segments of the brake pipe on other vehicles of the vehicle system. A valve assembly 122 of one or more valves is fluidly connected to the segment of the brake pipe via a branch pipe 124. The valve assembly can include a triple valve, a limiting valve (e.g., a quick service limiting valve), and/or the like.

The brake system also includes one or more air reservoirs 126 and a friction brake mechanism 128 (also referred to as friction brakes). Both one or more air reservoirs and the brake application mechanism are fluidly connected to the valve assembly. The one or more air reservoirs can include or represent an auxiliary reservoir, an emergency reservoir, or a combined reservoir that includes both an auxiliary vessel and an emergency vessel. The one or more air reservoir is referred to in the singular herein. The air reservoir stores compressed air for use in braking applications. The friction brake mechanism includes a brake cylinder 130 and a friction member 132. The brake cylinder is operably coupled between the friction member and the valve assembly. The friction member is actuated by the brake cylinder to selectively physically engage and then disengage a wheel 134 of the vehicle. The friction member may include a brake pad. In response to receiving compressed air, a piston 136 of the brake cylinder forces the friction member to engage the wheel, and the friction at the wheel-member interface slows rotation of the wheel.

Referring to both FIGS. 1 and 2, the braking assembly is designed such that a braking application of all brake systems of the vehicle system can be triggered by selectively reducing the pressure in the brake pipe. The brake pipe reduction can be accomplished by opening a release valve or vent along the brake pipe to release air from within the brake pipe. The brake pipe pressure reduction serves as a pneumatic signal that moves or propagates along the length of the vehicle system to sequentially reduce the pressure in the brake pipe segments of the individual vehicles. When the pressure in the local segment of the brake pipe is less than the pressure within the local reservoir onboard the vehicle, the valve assembly actuates to direct compressed air from the reservoir to the brake cylinder. The increased pressure in the cylinder forces the friction member into engagement with the wheel. The pressure in the reservoir is reduced as a result of supplying the air to the brake cylinder. The brake application can be terminated to release the friction brake mechanism from mechanical engagement with the wheel by charging the brake pipe via the compressors. For example, after the desired vent or reduction in the brake pipe has been achieved, the one or more compressors are operated to supply compressed air into the brake pipe, which gradually increases the pressure in the brake pipe along the length of the vehicle system. Once the pressure in the local segment of the brake pipe onboard a vehicle is greater than the pressure in the local reservoir, the valve assembly actuates to enable the brake pipe to supply compressed air to the reservoir. The pressure within the reservoirs onboard the different vehicles gradually increase over time as the reservoirs charge. The valve assembly also disconnects the reservoir from the brake cylinder and exhausts the air from the brake cylinder, which enables the friction member to separate from the wheel.

The reservoirs reach a fully charged state when the pressure of the reservoirs is within a tolerance range of a designated value associated with being fully charged. For example, the designated value associated with being fully charged may be 90 pounds per square inch (psi), and the tolerance range may be 1 psi, 0.5 psi, or the like. A fully charged reservoir may be equal to (e.g., within the tolerance range) of the pressure in the brake pipe. When the reservoirs are fully charged, such that the pressure in each reservoir is approximately unchanging over time, there is a pressure gradient that exists along the length of the brake pipe. The pressure gradient is attributable to inherent leakage along the brake pipe, such as leakage at the connectors between brake pipe segments. For example, although the portions of the brake pipe proximate to the compressors may have a pressure of 90 psi, portions of the brake pipe farthest away from the compressors may have a pressure of only 80 psi, such that a 10 psi gradient is present. When compressors are disposed at the ends of the vehicle system as shown in FIG. 1, the low pressure portion may be at the middle of the vehicle system. The gradient that exists at steady state when the reservoirs are fully charged is referred to as the natural or inherent gradient. Furthermore, due to the inherent leakage, the air within the brake pipe will have a natural flow rate even at steady state when the reservoirs are fully charged. In a non-limiting example, the natural flow rate may be 24 cubic feet per minute (cfm) and the natural gradient may be 7 psi.

Following a release of a brake application, the reservoirs charge to increase the pressure from a reduced charge state towards the fully charged state. During such charging periods, the pressure gradient exceeds the natural gradient and the flow rate exceeds the natural flow rate. The gradient during the charging periods is referred to herein as a false gradient. The false gradient is attributable to the delay in which compressed air propagates to portions of the brake pipe farthest away from the compressors. The false gradient is present until the braking assembly achieves the fully charged state of the reservoirs, at which time the pressure gradient along the brake pipe equals the natural gradient.

The braking assembly is designed to enable selection of the force at which the friction brake mechanisms apply. For example, an input device, such as a brake lever or handle, can be manipulated by an operator between positions. In a non-limiting example, the positions can include release, minimum service, full service, emergency, suppression, and/or continuous service. The minimum service position indicates an application of the friction brake mechanisms on the wheels with the least amount of force available, which slows the vehicle system at the slowest active-braking rate. The minimum service position causes the minimum available brake pipe reduction. Incremental movements of the input device from the minimum service position towards the full service position causes incrementally greater brake pipe reductions (e.g., pressure drops) and therefore stronger braking applications by supplying additional compressed air into the brake cylinders.

An unintentional and undesirable release of one or more friction brakes of the braking assembly can occur in response to a low or slight brake pipe reduction that occurs during the recharge of the braking assembly (e.g., when there is a significant false gradient present). The low or slight brake pipe reduction that risks the unintentional release can refer to the brake pipe reduction associated with the minimum service position of the input device, and optionally can also apply to other positional settings of the input device, such as the next one, two, three, or four positions of the input device adjacent to the minimum service position. The low or slight brake pipe reduction does not refer to the brake pipe reductions associated with the full service position or the emergency position.

The unintentional release is described with respect to the braking assembly shown in FIGS. 1 and 2 as follows. One or more valves of the valve assembly, such as the limiting valve, are designed to ensure that a sufficient amount of compressed air is supplied to the brake cylinders during any brake application to cause at least a designated pressure within the brake cylinder (which causes the friction member to exert a minimum or lower limit braking force on the wheel). The designated pressure may be, for example, within a range between 8 psi and 12 psi. When the reservoirs of the braking assembly are fully charged, if a slight brake pipe reduction (e.g., such as a minimum service reduction) is made, the valve assembly directs the compressed air from the reservoirs (e.g., auxiliary reservoirs) to the brake cylinders to develop pressures at least as high as the designated pressure with minimal to no utilization of brake pipe air. When the minimum service reduction or another slight brake pipe reduction is made while the reservoirs are at the reduced charge state, such that a false gradient is present, the valve assembly may direct compressed air from the brake pipe to the brake cylinders to supplement the compressed air from the reservoirs until the designated pressure in the brake cylinders is achieved. As a result of contributing compressed air to the brake cylinders, the pressure in the brake pipe may dip further than expected or targeted as a result of the brake pipe reduction. Once the designated pressure in the brake cylinders is achieved, the valve assembly increases the pressure in the brake pipe to its targeted stabilized pressure. This recovery of the brake pipe pressure may cause the pressure at one or more portions of the brake pipe to exceed the pressure in the respective reservoir. The differential may be sufficient to trigger the valve assembly to release one or more of the friction brakes, even though the brake release is unintentional and undesirable to the operator that controls operations of the vehicle system.

The unintentional brake release can be avoided by only making brake applications when the reservoirs are in the fully charged state and/or by only making relatively large brake pipe reductions, such as full service reductions. In either case, the compressed air from the brake pipe is not used to supplement the compressed air from the reservoirs, so the brake pipe pressure does not dip further than expected and then rise further than expected during the recovery of the brake pipe, triggering the brake release. It may not be practical, however, to only utilize the brakes during opportune times when the reservoirs are fully charged, as circumstances in the external environment may require multiple brake applications in succession. Furthermore, it may not be efficient and/or desirable to only make relatively large brake pipe reductions when braking. In addition, known vehicle systems may not monitor the charge state of all of the reservoirs onboard the vehicle system at all times, so an operator may not have the information needed to determine when slight brake pipe reductions are permitted without risking an unintentional brake release.

Embodiments of the brake control system and method described herein are configured to monitor the air in the brake pipe and automatically intervene when necessary to avoid the occurrence of an unintended brake release. For example, based on a measured property or characteristic of the air in the brake pipe, the brake control system determines a pressure reduction lower limit (PRLL). The PRLL represents a minimum allowable pressure reduction in the brake pipe, based on the measured property, that is expected to avoid an unintentional release of one or more of the friction brakes. For example, if the PRLL is determined to be 14 psi, then brake pipe reductions of 14 psi or greater (e.g., 15 psi, 20 psi, 25 psi, and the like) are permitted, and brake pipe reductions less than the PRLL (e.g., 10 psi, 13 psi, and the like) are not permitted. If a brake application command is received from an input device, such as the brake handle, that commands a brake pipe reduction that is less than the PRLL while the PRLL is enforced, then the brake control system automatically increases the brake pipe reduction to a value that is at least the PRLL. The brake control system is also designed to determine when the reservoirs are at the reduced charge state (e.g., not fully charged). Based on the charge state information, the brake control system determines time periods at which the enforce the PRLL. During other time periods when the PRLL is not enforced, brake application commands that command brake pipe reductions less than PRLL are permitted. For example, the brake control system does not interfere with the brake applications during time periods at which the PRLL is not enforced.

Figure 3:
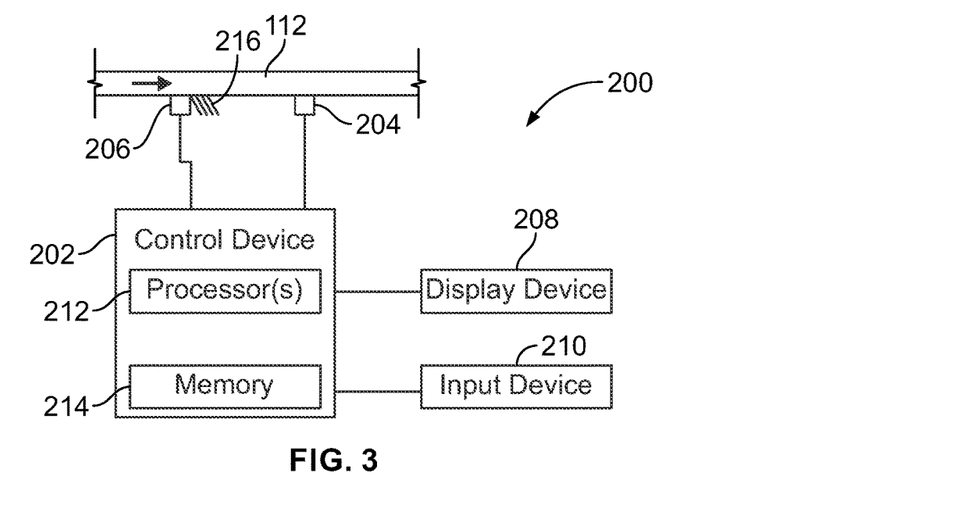
FIG. 3 is a schematic illustration of the brake control system according to an embodiment.

FIG. 3 is a schematic illustration of the brake control system 200 according to an embodiment. The brake control system may be installed onboard a vehicle system, such as the vehicle system 100 shown in FIG. 1. For example, the brake control system may be disposed on the propulsion-generating vehicle 104A at the location of the letter B in FIG. 1. The brake control system is operably coupled to the brake pipe of the brake assembly. The brake control system includes a control device 202, one or more sensors 204, and an actuator or switching device 206. The brake control system may also include a display device 208 and an input device 210. The control device is operably (e.g., communicatively) connected to the other components via wired and/or wireless communication pathways.

The control device performs at least some of the operations described herein to determine the PRLL and when to enforce the PRLL. The control device represents hardware circuitry that includes and/or is connected with one or more processors 212 (e.g., one or more microprocessors, integrated circuits, microcontrollers, field programmable gate arrays, etc.). The control device includes and/or is connected with a tangible and non-transitory computer-readable storage medium (e.g., memory) 214 disposed onboard the vehicle. For example, the memory may store programmed instructions (e.g., software) that is executed by the one or more processors to perform the operations of the control device described herein. The memory additionally or alternatively may store different information, such as a log or record of sensor data generated by the one or more sensors, determined PRLLs, brake control system enforcement events, and the like. The brake control system enforcement events can refer to events in which the control device increases a brake pipe reduction beyond a commanded brake pipe reduction to satisfy the PRLL.

The one or more sensors generate measurements of one or more properties of the air in the brake pipe over time. The measurements of the one or more properties are referred to as property measurements. A single sensor is shown in FIG. 3, but additional sensors optionally may be disposed at other locations along the length of the brake pipe. The sensor is mounted on or adjacent to the brake pipe. In one embodiment, the sensor is a flow sensor that measures the flow rate of air through the brake pipe. In another embodiment, the sensor is a pressure sensor that measures the pressure of air within the brake pipe. The sensor is disposed at a location that is between the two compressors shown in FIG. 1 to measure the air between the two compressors. The property measurements generated by the sensor are communicated to the control device for analysis. The property measurements may be generated and communicated periodically on a regular interval.

In an alternative embodiment, the brake control system may include at least two sensors that are spaced apart along the length of the brake pipe. For example, a first sensor may be located proximate to, but downstream of, one of the compressors according to a flow direction of compressed air supplied by that compressor. A second sensor may be disposed at a location associated with the low end of the pressure gradient, such as the middle of the vehicle system in FIG. 1 halfway between the two compressors. The first and second sensors may both measure the same property of the air, such as the pressure. The control device can compare the property measurements generated by the two sensors at a common instant or short time period to calculate a pressure gradient along the brake pipe.

The actuator or switching device is installed to selectively vent the brake pipe to release air from the brake pipe based on control signals received from the control device. For example, the actuator or switching device can be operably connected to an adjustable release valve or vent 216. Upon receipt of a first control signal, the actuator or switching device may physically open the release valve or vent to enable air from within the brake pipe to exhaust through the release valve or vent, which reduces the pressure within the brake pipe. Upon receipt of a second control signal, or upon no longer receiving the first control signal, the actuator or switching device may close the release valve or vent to seal the brake pipe, preventing the transfer of air into and from the brake pipe. The actuator or switching device may include a motor-driven actuation device, such as a linear actuator, and/or an electromechanical switching device, such as a contactor (e.g., relay), a solid state switch, and/or the like. The control device controls the actuator or switching device to enforce the PRLL when necessary. For example, to increase the brake pipe reduction to a level that satisfies the PRLL if the brake pipe reduction in the commanded brake application is insufficient, the control device generates the first control signal to cause the actuator or switching device to open the release valve or vent. The release valve or vent may be controlled to define a larger opening and/or to remain open for a longer amount of time, relative to the release valve or vent to achieve the commanded reduction, which causes a greater pressure drop in the brake pipe.

The input device can represent a brake handle or lever, a pedal, and/or a computer or components thereof. The computer components can include a keyboard, touchpad, mouse, or the like. The input device can be utilized by an operator to provide brake application commands. For example, the operator can manipulate a brake handle or lever to move to the minimum service position in order to trigger a brake application instigated by a minimum service reduction in the brake pipe.

The display device can be an integrated display screen onboard the vehicle and/or a display screen on a personal, tablet, or handheld computer (e.g., smartphone). The display device may be accessible to an operator on the vehicle system and/or operators remote from the vehicle system. The control device can generate control signals for controlling the content that is displayed on the display device. For example, the display device may be controlled to display pertinent information generated by the brake control system. The displayed information can include graphic indicia representing the current PRLL, the charge state of the air reservoirs, whether or not the PRLL is currently being enforced, and/or the like. The information on the display device can be used to coach an operator who manually controls the brake assembly of the vehicle system via the input device. For example, the display device may identify the PRLL, indicate that the PRLL is currently being enforced (because the reservoirs are charging), and that any brake application command should call for a brake pipe reduction of at least the current PRLL to avoid the risk of an unintentional brake release. In an embodiment, the brake control system can override manual brake application commands that call for brake pipe reductions less than the current PRLL. For example, if the manual input commands a brake pipe reduction lower than the current PRLL while the PRLL is being enforced, the brake control system may automatically increase the brake pipe reduction beyond the commanded reduction to a level that is no less than the PRLL. Alternatively, the brake control system may be configured to allow the operator to override or ignore the displayed suggestions provided by the brake control system, even if one or more friction brake mechanisms experience the unintentional release due to operator error.

The control device (e.g., the one or more processors thereof) receive the property measurement generated by the sensor. The control device determines the pressure reduction lower limit (PRLL) based on the property measurement. The PRLL may be empirically or experimentally determined using the property measurement as an input value. For example, experimental data can be generated that independently monitors multiple properties of the vehicle system either in a test setting or during prior trips of the vehicle system (or even trips of other, similar vehicle systems). The multiple properties that are monitored can include the flow rate in the brake pipe, the pressure gradient along the brake pipe, the pressure in the air reservoirs, brake pipe reductions that are made, and/or whether any unintentional brake release occurs. In a non-limiting example, the experiments and/or testing may include varying the brake pipe reductions and the charge state of the reservoirs during which the brake pipe reductions are made, and monitoring the effects of such adjustments on the flow rate and/or pressure gradient as well as recording which sets of stimuli cause an unintentional brake release. For example, an experiment can be set up that has a set number, such as five, of different brake pipe reduction amounts and another set number, such as 4, of different charge states of the reservoirs. The experimental testing can include performing the brake pipe reductions (e.g., A-E) at each of the four charge states (e.g., 1-4) over time to yield twenty total conditions (e.g., A1, B1, C1, D1, E1, A2, B2, C2, D2, E2, A3, B3, etc.). There may be more or less than twenty conditions actually tested. The vehicle system optionally may be outfitted with additional sensors during the experimental testing, such as pressure sensors in the reservoirs and/or additional sensors along the length of the brake pipe.

The testing yields data that can be analyzed to determine a correlation between a measured property of the air in the brake pipe, such as flow rate or pressure, and the charge state of the reservoirs. For example, as described above, the flow rate of air in the brake pipe is greater during charging than during the steady state condition when the reservoirs are at the charged state. A function or look-up table can be generated that links the flow rate of air in the brake pipe to a charge state of the reservoirs, such as whether the reservoirs are at the reduced charge state or the fully charged state. When the flow rate is outside of a tolerance range of a designated value associated with the one or more air reservoirs being at a fully charged state, the function or look-up table indicates that the reservoirs are at the reduced charge state. For example, the experimental testing may monitor the pressure in one specific reservoir over time. When the flow rate in the brake pipe reaches steady state, indicating that the reservoirs are fully charged, the pressure in the reservoir can be measured and recorded as the designated value associated with the fully charged state. The tolerance range may be 5%, 10%, or the like of the designated value associated with the fully charged state. For example, if the fully charged state pressure in the reservoir is 100 psi, then pressures 90 psi and above are considered fully charged and pressures below 90 psi indicate the reduced charge state. The tolerance range optionally can be selected by an operator.

Data pairs can be formed between the flow rate in the brake pipe and the pressure in the reservoir over time. Marking the pressure data points as fully charged or reduced charge based on the pressure value, provides a range of flow rates associated with the fully charged state and another range of flow rates associated with the reduced charge state. This correlation between flow rate in the brake pipe and the charge state of the reservoir can be defined in a mathematical function or plotted in a graph or look-up table. The correlation can be used in the field to determine the charge state of the reservoirs onboard the vehicle system based only on the flow rate. Although flow rate is described in the above example, other property measurements of the air in the brake pipe, such as pressure and pressure gradient, can be monitored instead of flow rate to generate a correlation with the charge state.

The testing also yields data that can be analyzed to determine a correlation between a measured property of the air in the brake pipe and brake pipe reduction values that have the potential to cause an unintentional brake release. For example, as described above, the experimental testing may include making different incremental brake pipe reductions at each of different incremental pressure conditions in the reservoirs. The output of the testing can indicate a range of brake pipe reductions and pressure conditions in the reservoirs that are associated with a risk of causing an unintentional brake release. Furthermore, the measured property of the air in the brake pipe at each of these high-risk conditions is known and can be correlated with the data.

Figure 4:
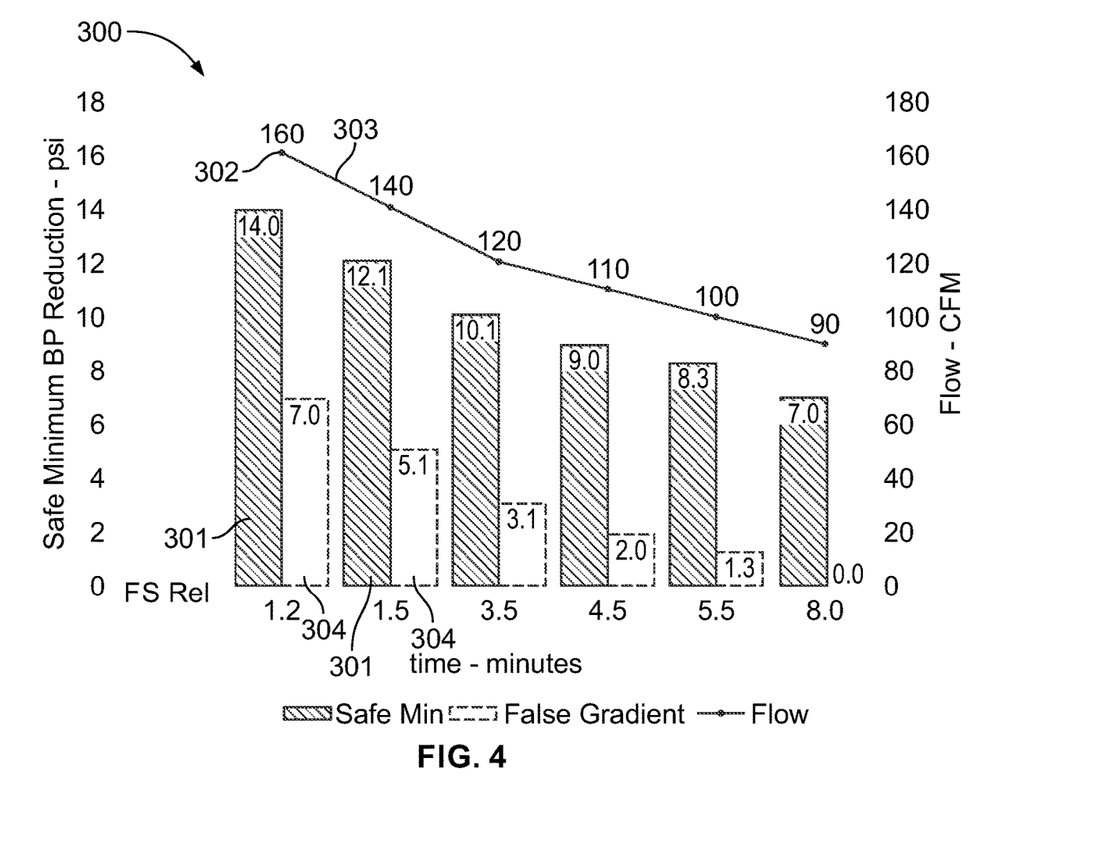
FIG. 4 is a graph plotting safe minimum brake pipe reductions and flow rate over time according to an embodiment.

Reference is now made to FIG. 4, which is a graph 300 plotting safe minimum brake pipe reductions 301 and flow rate 303 over time according to an embodiment. The graph 300 may be associated with a vehicle system that includes at least two compressors spaced apart from each other along the length of the vehicle system, such as the vehicle system 100 in FIG. 1. For example, the experimental testing may indicate that the steady state flow rate of air in the brake pipe is about 90 cfm. The flow rate values, such as 90 cfm, may be a combined value that is the sum of the flow rate monitored proximate to each of the two compressors, as the flow of compressed air from the two compressors may be in opposite directions.

When the measured flow rate of air in the brake pipe is 160 cfm, as shown at point 302, the large differential between the measured flow rate and the steady state flow rate indicates that the reservoirs are at the reduced charge state. Furthermore, the testing of different brake application conditions indicate that brake application commands causing brake pipe reductions of 13 psi or less, when the flow rate is 160 cfm, are associated with unintentional brake release. For example, the likelihood of an unintentional release is substantial, and increases as the brake pipe reduction decreases. Furthermore, the testing at 160 cfm may indicate that brake application commands causing brake pipe reductions of at least 14.0 psi have little or no risk of causing an unintentional brake release. Thus, brake pipe reductions at least 14.0 psi are safe, and the 14.0 psi value is designated as the pressure reduction lower limit (PRLL) for the flow rate of 160 cfm. As a result, when the flow rate is measured as 160 cfm, the PRLL is determined by the control device (e.g., the one or more processors thereof) to be 14.0. If a brake application command is received that calls for a slight brake pipe reduction less than 14.0 psi, the brake control system can automatically increase the brake pipe reduction to a value that is at least 14.0 psi to avoid the risk of an unintentional release.

As shown in FIG. 4, the PRLL values decrease as the flow rate drops towards the steady state value. The relationship between the flow rate and the PRLL can be interpolated using the experimental testing data and defined in a function and/or a look-up table. Therefore, upon receiving an input flow rate that was not explicitly tests, such as 150 cfm for example, the control device can determine the PRLL using the determined correlation between the flow rate and the PRLL. Although flow rate is described in the above example, other property measurements of the air in the brake pipe, such as pressure and pressure gradient, can be monitored instead of flow rate to generate a correlation with the PRLL.

The graph 300 in FIG. 4 also depicts false gradient values 304 which represent additional pressure gradient in the brake pipe in excess of the steady state or natural gradient. The false gradients are greater at higher flow rates than at lower flow rate. In an alternative embodiment, the PRLL can be determined by capturing the relationship between the flow rate and the false gradient. Upon receiving an input flow rate value, the false gradient can be calculated or determined using the function or look-up table, and then the PRLL can be calculated by adding a designated constant to the false gradient. In the illustrated embodiment, the constant is 7 psi, such that a false gradient of 5.1 yields a PRLL of 12.1 (7+5.1=12.1).

Figure 5:
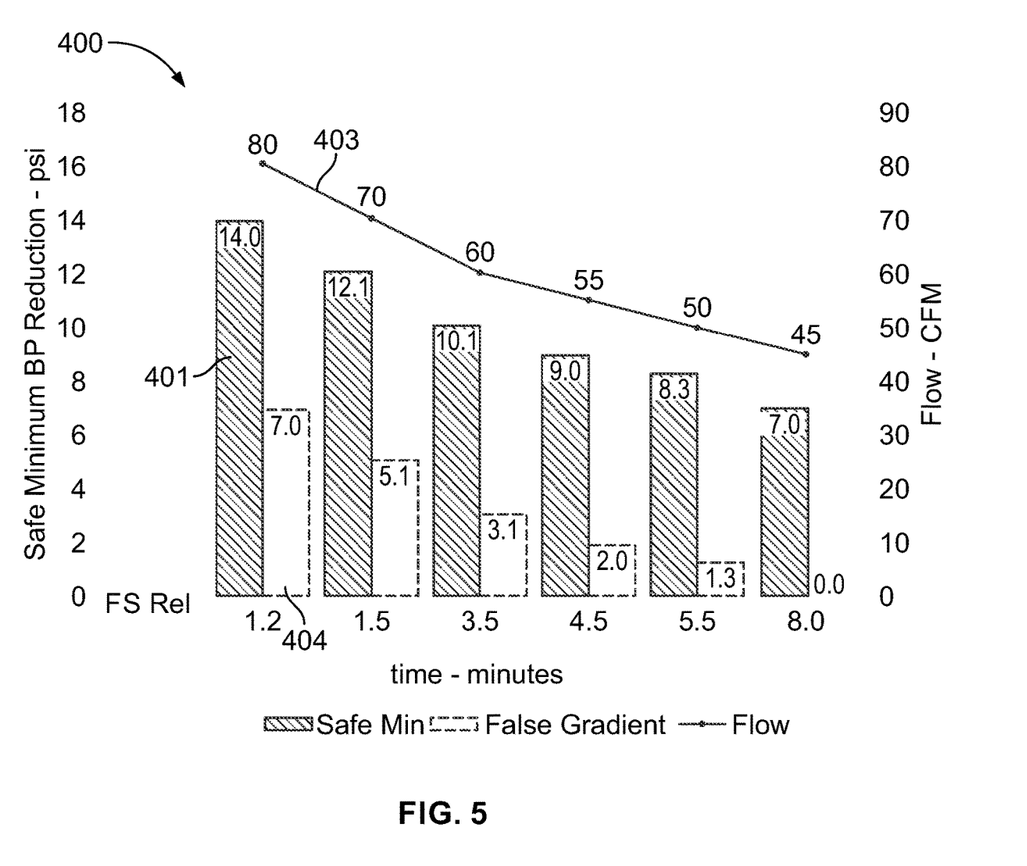
FIG. 5 is a graph plotting safe minimum brake pipe reductions and flow rate over time for another type of brake assembly than the graph in FIG. 4.

FIG. 5 is a graph 400 plotting safe minimum brake pipe reductions and flow rate over time for another type of brake assembly than the graph 300 in FIG. 4. The graph 400 may be associated with a vehicle system that includes only one air compressor which supplies compressed air to the brake pipe. The measured flow rates 403 are less than the flow rates 303 shown in the two-compressor brake assembly depicted in FIG. 4, but the general relationship between the flow rate, PRLL 401, and the false gradients 404 is approximately the same as shown in FIG. 4. Therefore, the brake control system can determine the charge state and PRLL values for various different types of brake assemblies. The brake control system may store functions or look-up tables associated with different brake assemblies, and may select which to use based on received information identifying the type of brake assembly on the vehicle system.

The control device is configured to receive new values of the property measurement of air in the brake pipe over time. Upon receiving a new value, the control device can input the new value into the function or look-up table to determine an updated PRLL. The updated PRLL replaces the previous PRLL, such that the control device no longer enforces the previous PRLL.

Figure 6:
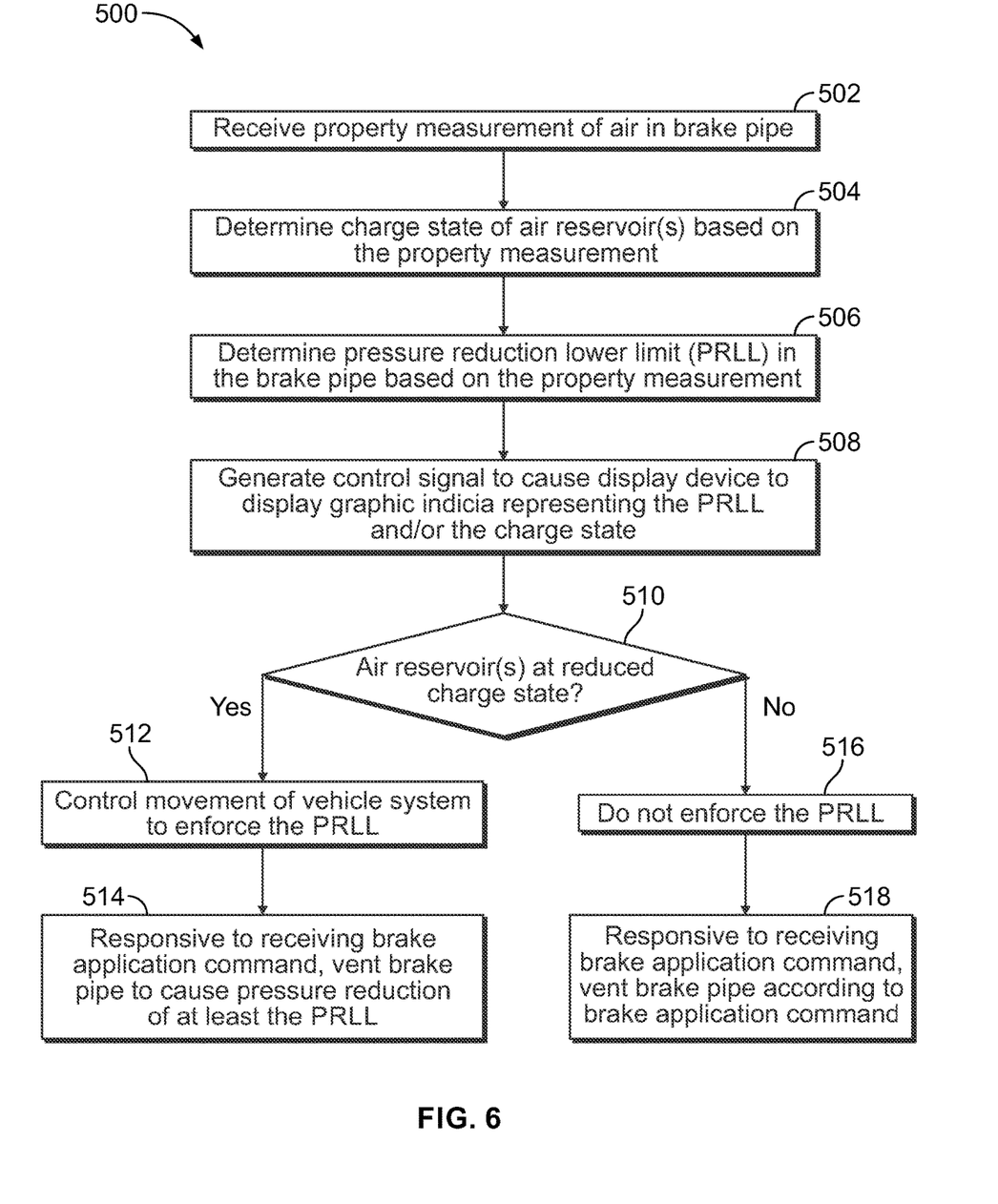
FIG. 6 is a flow chart of a method for controlling movement of a vehicle system to avoid an unintentional brake release according to an embodiment.

FIG. 6 is a flow chart 500 of a method for controlling movement of a vehicle system to avoid an unintentional brake release according to an embodiment. Various steps of the method may be performed by the brake control system 200 described above with reference to FIGS. 1 through 5, in particular FIGS. 3 through 5. For example, various steps may be performed by the one or more processors of the control device of the brake control system. The method may include additional steps than shown in FIG. 6, fewer steps than shown in FIG. 6, and/or different steps than the steps shown in FIG. 6.

At 502, a property measurement of air in a brake pipe of a braking assembly on a vehicle system is received. The property measurement may be received from a sensor that monitors the air in the brake pipe and periodically generates the property measurement. The property measurement may be flow rate, pressure, and/or a pressure gradient representing a range between the pressure at multiple locations along the brake pipe. In a non-limiting example, the property measurement is flow rate.

At 504, a charge state of one or more air reservoir(s) of the brake assembly is determined based on the property measurement. The charge state can indicate whether the reservoir(s) are at a fully charged state or a reduced charge state, which occurs after a brake application when the reservoir(s) are at least partially depleted. At 506, a pressure reduction lower limit (PRLL) is determined based on the property measurement of the air in the brake pipe. The PRLL can be determined by inputting the property measurement into a function, look-up table, or the like (e.g., a computer-generated model) that is generated based on empirical and/or experimental data.

At 508, a control signal is generated to cause a display device to display graphic indicia representing the PRLL and/or the charge state. The displayed information can coach an operator of the vehicle system to make informed decisions regarding the extent or amount of brake pipe reduction to command for a brake application. At 510, it is determined whether the one or more reservoirs are at the reduced charge state. The reduced charge state can be determined at 504 based on the property measurement of air in the brake pipe being outside of a tolerance range of a designated value associated with the one or more air reservoirs at the fully charged state.

If it is determined that the reservoir(s) are at the reduced charge state, then flow proceeds to 512 and movement of the vehicle system is controlled to enforce the PRLL. For example, the PRLL is enforced by not allowing a pressure reduction in the brake pipe that is less than the PRLL. At 514, in response to receiving a brake application command while the PRLL is being enforced, the brake pipe is vented to cause a pressure reduction that is at least the PRLL. For example, if the brake application command calls for a reduction of 7 psi, but the PRLL is 10 psi, the brake pipe is vented to cause the pressure in the brake pipe to drop at least 10 psi.

If it is determined at 510 that the reservoir(s) are not at the reduced charge state, and instead are at the fully charged state, then flow proceeds to 516 and the PRLL is not enforced. The PRLL is not enforced during time periods in which the reservoir(s) are at the fully charged state. At 518, in response to receiving a brake application command while the PRLL is not being enforced, the brake pipe is vented according to the brake application command. For example, even if the brake application command calls for a minimum service reduction, the brake pipe is vented to provide the commanded reduction. Stated differently, the brake intervention method does not intervene with the brake application command.

The method may continuously repeat over time, such as throughout a trip of a vehicle system. For example, new property measurements may be received at 502 as the property measurements are generated over time. A new property measurement is used to determine an updated PRLL at 506 and to update the charge state of the reservoir(s) at 504. A new control signal may be generated at 508 to display the updated information to the operator. The brake intervention method may operate in the background and only intervene when it is determined necessary to prevent a slight brake pipe reduction that risks causing an unintentional brake release.

In one or more embodiments, a brake control system is provided that includes one or more processors. The one or more processors are configured to be communicatively connected to at least one sensor configured to output at least one property measurement of air in a brake pipe of a vehicle braking assembly. The one or more processors are configured to determine, based on the at least one property measurement, a pressure reduction lower limit (PRLL) in the brake pipe. The one or more processors are further configured to control movement of a vehicle system that includes the brake pipe to enforce the PRLL by preventing a pressure reduction in the brake pipe that is less than the PRLL while one or more air reservoirs of the vehicle braking assembly are at a reduced charge state.

Optionally, the one or more processors are configured to enforce the PRLL by venting the brake pipe to cause a pressure reduction in the brake pipe that is at least the PRLL in response to receiving a brake application command. Preventing the pressure reduction in the brake pipe that is less than the PRLL may prevent an unintentional release of the one or more friction brakes of the braking assembly, relative to a brake application command that would result in the pressure reduction in the brake pipe being less than the PRLL. Optionally, the one or more processors are further configured to not enforce the PRLL, to allow a pressure reduction in the brake pipe less than the PRLL in response to receiving a brake application command, during time periods that the one or more air reservoirs are at a fully charged state.

Optionally, the one or more processors are further configured to determine, based on the at least one property measurement, that the one or more air reservoirs of the braking assembly are at the reduced charge state. The one or more processors may be configured to determine that the one or more air reservoirs are at the reduced charge state based on the at least one property measurement of air in the brake pipe being outside of a tolerance range of a designated value associated with the one or more air reservoirs at a fully charged state.

Optionally, the at least one property measurement of air generated by the at least one sensor includes one or more of flow rate, pressure, or a pressure gradient representing a range between the pressure at multiple locations along the brake pipe. Optionally, the brake control system also includes the at least one sensor. The at least one sensor may include a flow sensor, and the at least one property measurement may be a flow rate measurement of the air in the brake pipe. Optionally, the vehicle system includes a first air compressor and a second air compressor that are configured to supply air to the brake pipe at spaced apart locations along the brake pipe. The at least one sensor may be configured to generate the at least one property measurement at a location of the brake pipe that is between the first and second air compressors.

Optionally, in response to receiving a new value of the at least one property measurement of air in the brake pipe generated by the at least one sensor, the one or more processors may be configured to update the PRLL during the movement of the vehicle system based on the new value of the at least one property measurement. Optionally, the one or more processors are configured to generate a control signal configured to cause a display device to display graphic indicia representing the PRLL. Optionally, the one or more processors are disposed onboard one of multiple vehicles of the vehicle system. The vehicles may be mechanically coupled together in a line, with the brake pipe continuously extending along the vehicles of the vehicle system. Optionally, the vehicle system is a rail-based train.

In one or more embodiments, a method is provided that includes receiving at least one property measurement of air in a brake pipe of a braking assembly on a vehicle system. The method includes determining, based on the at least one property measurement, a pressure reduction lower limit (PRLL) in the brake pipe. The method also includes controlling movement of the vehicle system to enforce the PRLL, by not allowing a pressure reduction in the brake pipe that is less than the PRLL, during time periods that one or more air reservoirs of the braking assembly are at a reduced charge state.

Optionally, controlling the movement of the vehicle system to enforce the PRLL comprises venting the brake pipe to cause a pressure reduction in the brake pipe that is at least the PRLL in response to receiving a brake application command. Optionally, the method further includes not enforcing the PRLL, to allow a pressure reduction in the brake pipe less than the PRLL in response to receiving a brake application command, during time periods that the one or more air reservoirs are at a fully charged state.

Optionally, the method further includes determining, based on the at least one property measurement, that the one or more air reservoirs of the braking assembly are at the reduced charge state. The one or more air reservoirs of the braking assembly may be determined to be at the reduced charge state based on the at least one property measurement of air in the brake pipe being outside of a tolerance range of a designated value associated with the one or more air reservoirs at a fully charged state.

Optionally, the at least one property measurement of air in the brake pipe is one or more of flow rate, pressure, or a pressure gradient representing a range between the pressure at multiple locations along the brake pipe. For example, the at least one property measurement of air in the brake pipe may be flow rate.

Optionally, the method further includes generating new values of the at least one property measurement of air in the brake pipe over time, and updating the PRLL over time during the movement of the vehicle system based on the new values of the at least one property measurement.

Optionally, the method further includes generating a control signal configured to cause a display device to display graphic indicia representing the PRLL.

Optionally, the vehicle system includes a first air compressor and a second air compressor that are configured to supply air to the brake pipe at spaced apart locations along the brake pipe. The at least one property measurement of air in the brake pipe may be generated at a location of the brake pipe that is between the first and second air compressors. Optionally, the vehicle system includes multiple vehicles mechanically coupled together and the brake pipe continuously extends along the multiple vehicles.

In one or more embodiments, a brake control system is provided that includes a flow sensor and one or more processors. The flow sensor is configured to generate a flow rate measurement of air in a brake pipe of a braking assembly on a vehicle system. The one or more processors are configured to be communicatively connected to the flow sensor and to determine, based on the flow rate measurement received from the flow sensor, that one or more air reservoirs of the braking assembly are at a reduced charge state. The one or more processors are further configured to determine, based on the flow rate measurement, a pressure reduction lower limit (PRLL) in the brake pipe. Responsive to receiving a brake application command during one of the time periods that the one or more air reservoirs are at the reduced charge state, the one or more processors are configured to control movement of the vehicle system to enforce the PRLL by venting the brake pipe to cause a pressure reduction in the brake pipe that is no less than the PRLL.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A brake control system comprising:
   one or more processors configured to be communicatively connected to at least one sensor configured to output a flow rate measurement of air in a brake pipe of a braking assembly on a vehicle system, the one or more processors configured to determine a pressure reduction lower limit (PRLL) in the brake pipe based on the flow rate measurement of air in the brake pipe,
   the one or more processors configured to control movement of the vehicle system to enforce the PRLL by preventing a pressure reduction in the brake pipe that is less than the PRLL while one or more air reservoirs of the braking assembly are at a reduced charge state.

2. The brake control system of claim 1, wherein the one or more processors are configured to enforce the PRLL by venting the brake pipe to cause a pressure reduction in the brake pipe that is equal to or exceeds the PRLL in response to receiving a brake application command.

3. The brake control system of claim 1, wherein the one or more processors are configured to cause the pressure reduction in the brake pipe to be equal to or exceed the PRLL to prevent an unintentional release of one or more friction brakes of the braking assembly.

4. The brake control system of claim 1, wherein the one or more processors are further configured to not enforce the PRLL, to allow a second pressure reduction in the brake pipe that is less than the PRLL in response to receiving a second brake application command during a time period that the one or more air reservoirs are at a fully charged state.

5. The brake control system of claim 1, wherein the one or more processors are further configured to determine, based on the flow rate measurement, that the one or more air reservoirs of the braking assembly are at the reduced charge state.

6. The brake control system of claim 5, wherein the one or more processors are configured to determine that the one or more air reservoirs are at the reduced charge state based on the flow rate measurement of air in the brake pipe being outside of a tolerance range of a designated value associated with the one or more air reservoirs at a fully charged state.

7. The brake control system of claim 1, wherein the at least one sensor is a flow sensor.

8. The brake control system of claim 1, wherein, in response to receiving a new value of the flow rate measurement of air in the brake pipe generated by the at least one sensor, the one or more processors are configured to update the PRLL during the movement of the vehicle system based on the new value of the flow rate measurement.

9. The brake control system of claim 1, further comprising the at least one sensor, wherein the vehicle system includes a first air compressor and a second air compressor that are configured to supply air to the brake pipe at spaced apart locations along the brake pipe, and the at least one sensor is configured to generate the flow rate measurement at a location of the brake pipe that is between the first and second air compressors.

10. The brake control system of claim 1, wherein the one or more processors are configured to generate a control signal configured to cause a display device to display graphic indicia representing the PRLL.

11. The brake control system of claim 1, wherein the one or more processors are disposed onboard one of multiple vehicles of the vehicle system, the vehicles mechanically coupled together in a line, the brake pipe continuously extending along the vehicles of the vehicle system.

12. The brake control system of claim 1, wherein the vehicle system is a rail-based train.

13. A method comprising:
    receiving a flow rate measurement of air in a brake pipe of a braking assembly on a vehicle system;
    determining, based on the flow rate measurement, a pressure reduction lower limit (PRLL) in the brake pipe; and
    controlling movement of the vehicle system to enforce the PRLL by not allowing a pressure reduction in the brake pipe that is less than the PRLL during time periods that one or more air reservoirs of the braking assembly are at a reduced charge state.

14. The method of claim 13, wherein controlling the movement of the vehicle system to enforce the PRLL comprises venting the brake pipe to cause a pressure reduction in the brake pipe that is equal to or greater than the PRLL in response to receiving a brake application command.

15. The method of claim 13, further comprising not enforcing the PRLL, to allow a pressure reduction in the brake pipe less than the PRLL, during second time periods that the one or more air reservoirs are at a fully charged state.

16. The method of claim 13, further comprising determining that the one or more air reservoirs of the braking assembly are at the reduced charge state based on the flow rate measurement of air in the brake pipe being outside of a tolerance range of a designated value associated with the one or more air reservoirs at a fully charged state.

17. The method of claim 13, wherein the vehicle system includes a first air compressor and a second air compressor that are configured to supply air to the brake pipe at spaced apart locations along the brake pipe, and the flow rate measurement of air in the brake pipe is generated at a location of the brake pipe that is between the first and second air compressors.

18. A brake control system comprising:
    a flow sensor configured to generate a flow rate measurement of air in a brake pipe of a braking assembly on a vehicle system; and
    one or more processors configured to be communicatively connected to the flow sensor and to determine, based on the flow rate measurement received from the flow sensor, that one or more air reservoirs of the braking assembly are at a reduced charge state, the one or more processors further configured to determine, based on the flow rate measurement, a pressure reduction lower limit (PRLL) in the brake pipe, and responsive to receiving a brake application command during a time period that the one or more air reservoirs are at the reduced charge state, the one or more processors are configured to control movement of the vehicle system to enforce the PRLL by venting the brake pipe to cause a pressure reduction in the brake pipe that is equal to or greater than the PRLL.

19. The brake control system of claim 18, wherein the vehicle system includes a first air compressor and a second air compressor that are configured to supply air to the brake pipe at spaced apart locations along the brake pipe, and the flow sensor is configured to generate the flow rate measurement at a location of the brake pipe that is between the first and second air compressors.

20. The brake control system of claim 18, wherein the one or more processors are configured to determine that the one or more air reservoirs are at a fully charged state during a second time period, and are configured to not enforce the PRLL during the second time period to allow a pressure reduction in the brake pipe that is less than the PRLL in response to receiving a second brake application command.

\* \* \* \* \*